United States Patent
Kim et al.

(10) Patent No.: US 9,473,731 B2
(45) Date of Patent: Oct. 18, 2016

(54) WIRELESS DISPLAY SINK DEVICE

(71) Applicant: LG DISPLAY CO., LTD., Seoul (KR)

(72) Inventors: Miok Kim, Goyang-si (KR); Heejung Hong, Seoul (KR); Hyeseon Eom, Daegu (KR); Hyungseok Cha, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/508,350

(22) Filed: Oct. 7, 2014

(65) Prior Publication Data

US 2015/0189218 A1 Jul. 2, 2015

(30) Foreign Application Priority Data

Dec. 27, 2013 (KR) ........................ 10-2013-0166171

(51) Int. Cl.

| | |
|---|---|
| *H04N 3/14* | (2006.01) |
| *H04N 5/46* | (2006.01) |
| *G09G 5/00* | (2006.01) |
| *H04N 21/4363* | (2011.01) |
| *H04N 19/44* | (2014.01) |
| *G09G 3/34* | (2006.01) |
| *G09G 3/36* | (2006.01) |
| *H04N 5/44* | (2011.01) |
| *H04N 5/60* | (2006.01) |
| *H04N 5/74* | (2006.01) |
| *H04N 21/41* | (2011.01) |

(52) U.S. Cl.
CPC .............. *H04N 5/46* (2013.01); *G09G 3/3406* (2013.01); *G09G 3/3611* (2013.01); *G09G 5/006* (2013.01); *H04N 5/4403* (2013.01); *H04N 5/602* (2013.01); *H04N 5/7408* (2013.01); *H04N 19/44* (2014.11); *H04N 21/4122* (2013.01); *H04N 21/43637* (2013.01); *G09G 2310/08* (2013.01); *G09G 2370/08* (2013.01); *G09G 2370/10* (2013.01); *G09G 2370/12* (2013.01); *G09G 2370/14* (2013.01); *G09G 2370/16* (2013.01); *H04N 2005/443* (2013.01)

(58) Field of Classification Search
CPC ......................... H04N 5/775; H04N 21/4122
USPC ........................................................ 348/792
See application file for complete search history.

(56) References Cited

U.S. PATENT DOCUMENTS

| | | | | | |
|---|---|---|---|---|---|
| 5,699,231 | A | * | 12/1997 | ElHatem | H05K 1/0256 174/260 |
| 7,701,451 | B1 | * | 4/2010 | Daewon | G09G 3/2096 345/204 |
| 2006/0209892 | A1 | * | 9/2006 | MacMullan | H04N 5/775 370/468 |
| 2012/0042102 | A1 | * | 2/2012 | Chung | H04M 1/7253 710/33 |
| 2012/0303939 | A1 | | 11/2012 | Cain et al. | |

(Continued)

OTHER PUBLICATIONS

Extended European Search Report issued in European Patent Application No. 14197886.6, mailed May 27, 2015, 8 pages.

*Primary Examiner* — Michael Lee (74) *Attorney, Agent, or Firm* — Brinks Gilson & Lione (57) ABSTRACT

A wireless display sink device comprises a display panel driver and a PCB (Printed Circuit Board) connected to a wireless communication module. The PCB comprises: a decoder that decodes audio/video data received from the wireless communication module and separates audio data and video data; an audio DAC (Digital Analog Converter) that converts the audio data into an analog voltage; and a timing controller that transmits the video data to the display panel driver and controls the operation timing of the display panel driver.

11 Claims, 13 Drawing Sheets

(56) References Cited

U.S. PATENT DOCUMENTS

| | | | |
|---|---|---|---|
| 2012/0313863 A1* | 12/2012 | Hsu | G06F 3/0412 345/173 |
| 2013/0111533 A1 | 5/2013 | Klarke et al. | |
| 2013/0174208 A1* | 7/2013 | Lee | H04N 21/4122 725/109 |
| 2013/0222210 A1 | 8/2013 | Wang et al. | |

* cited by examiner

WIRELESS DISPLAY SINK DEVICE

This application claims the benefit of priority to to Korea Patent Application No. 10-2013-0166171 filed on Dec. 27, 2013, which is incorporated herein by reference for all purposes as if fully set forth herein.

BACKGROUND

1. Field

This document relates to a wireless display sink device, which reproduces video contents received from a source device via wireless communication.

2. Related Art

The technology for sharing contents between a source device and a sink device via wireless communication has been applied to smart devices.

Wireless video transmission technology allows for transmission of video/audio data streams from a source device to a sink device via Wi-Fi. Through wireless video transmission technology, video/audio contents can be shared between a source device and a sink device via wireless communication. Miracast, a wireless video transmission technology recently used in smartphones, enables N-screen service by connecting a sink device and one or more source devices by a radio communication link.

Wireless video transmission technology falls into two categories: establishing a wireless communication link through an AP (access point); and establishing a wireless communication link using Wi-Fi direct technology.

Using Wi-Fi direct technology enables a source device and a sink device to connect with each other without an AP or router. This, however, requires attaching a dongle, compatible with programs certified by the Wi-Fi appliance, to the sink device.

A conventional sink device cannot receive data if it uses an AP and is more than a certain distance away from the AP. Also, the conventional sink device requires its own wireless adapter such as a certified dongle when using Wi-Fi direct, which results in additional costs.

SUMMARY

An exemplary embodiment provides a wireless display sink device comprising a display panel driver and a PCB (Printed Circuit Board) connected to a wireless communication module.

The PCB comprises: a decoder that decodes audio/video data received from the wireless communication module and separates audio data and video data; an audio DAC (Digital Analog Converter) that converts the audio data into an analog voltage; and a timing controller that transmits the video data to the display panel driver and controls the operation timing of the display panel driver.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, exemplary embodiments of this document will be described in detail with reference to the attached drawings. Throughout the specification, like reference numerals denote substantially like components. Hereinafter, the detailed description of related known functions or configurations that may unnecessarily obscure the subject matter of the present invention in describing the present invention will be omitted.

In the following description, a source device is a device that transmits video/audio data streams. Examples of the source device may include a mobile device such as a smartphone or a laptop, a navigation system, a set-top box, a DVD player, a Blu-ray player, and a computer.

A wireless display sink device comprises a display panel, a display panel driver, a timing controller that controls the display panel driver, and a wireless communication module. The wireless display sink device establishes a wireless communication link with a source device through a wireless communication module without its own wireless communication device such as an AP or dongle.

The wireless display sink device is connected to the display panel driver. A display device connected to the display panel driver may be implemented as a flat panel display device, such as a liquid crystal display (LCD), a field emission display (FED), a plasma display panel (PDP), an organic light emitting display (OLED), or an electrophoresis display (EPD).

Figure 1:
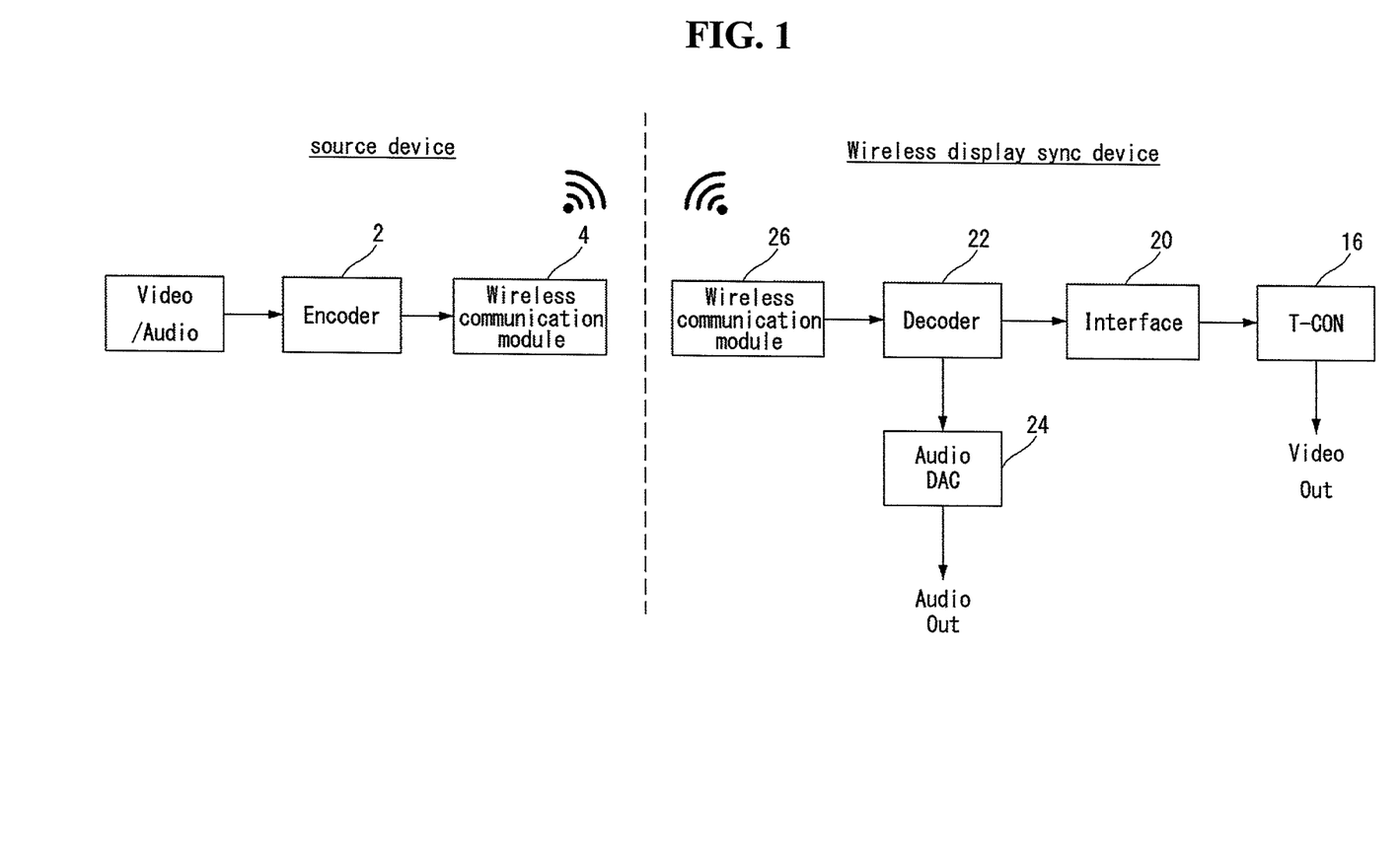
FIG. 1 is a block diagram showing a wireless communication system according to an exemplary embodiment.
Figure 2:
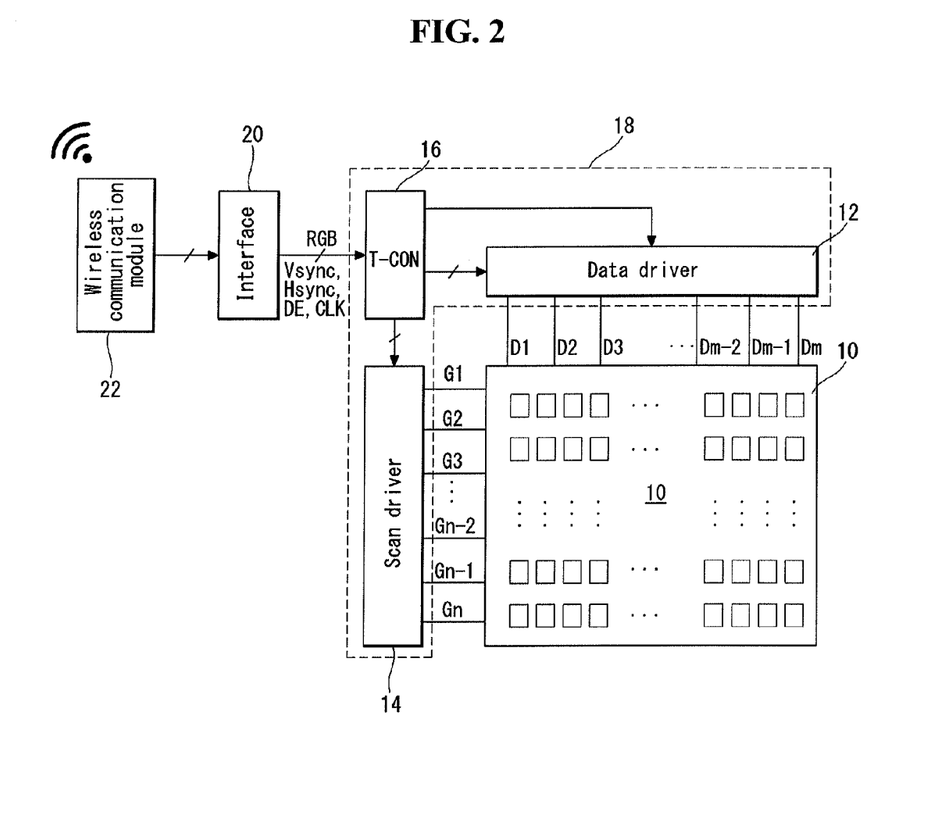
FIG. 2 is a block diagram showing in detail a display panel, a display panel driver, and a timing controller.

Referring to FIGS. 1 and 2, the source device comprises an encoder 2 and a wireless communication module 4.

The wireless display sink device comprises a display panel driver 18 and a PCB (Printed Circuit Board) connected to the wireless communication module. The PCB comprises a wireless communication module 26, a decoder 22, an audio DAC (Digital Analog Converter) 24, an interface 20, and a timing controller (T-CON) 16.

The source device transmits encoded video and audio data streams to the wireless display sink device. The encoder 2 encodes video and audio data by a predetermined algorithm. For example, the encoder 2 may encode video data in MPEG4 or H.264 format and encode audio data in LPCM44.1, LPCM16-48, AAC, AC-3, AAA, AMR, WMA, MPEG-2 Audio, or MPEG-4 Audio format. The encoded video and audio data streams are transmitted to the wireless display sink device through the wireless communication module 4.

The wireless communication module 4 of the source device and the wireless communication module 26 of the wireless display sink device may transmit and receive data according to a wireless data communication standard or cellular communication standard. The wireless data communication standard comprises IEEE 802.16 (for wireless metropolitan area networks) such as WiMax and Wibro, IEE 802.15 (for wireless personal area networks) such as Bluetooth, Zigbee, UWB, and Li-FI, and IEEE 802.11 (for wireless local area networks) such as Wi-Fi and WiGig. The cellular communication standard comprises 4G standards such as fD-LTE and TD-LTE, 3G standards such as WCDMA, GSM, HDSA, HDSA+, and CDMA2000, and 2G standards such as CDMA and GSM.

The decoder 22 decodes data streams received from the wireless communication module 26 to restore audio data and video data and separate them. The decoder 22 implements a restoration algorithm corresponding to the algorithm of the encoder 2 equivalent to that of the encoder 2 to decode data received through the wireless communication module 26 and restore video data and audio data to their state before encoding.

The audio DAC 24 converts audio data into an analog voltage and outputs it to an audio player, i.e., speaker. The interface 20 delivers the video data input from the decoder 22 to the timing controller 16.

The display panel driver 18 writes video data of an input image to the pixels of a display panel 10. The display panel comprises a pixel array that displays video data of an input image. The pixel array comprises a plurality of data lines D1 to Dm (m is a positive integer), a plurality of scan lines G1 to Gm (n is a positive integer) crossing the data lines D1 to Dm, and pixels arranged in a matrix form. Color filters for color representation may be formed on the display panel 10.

Figure 3:
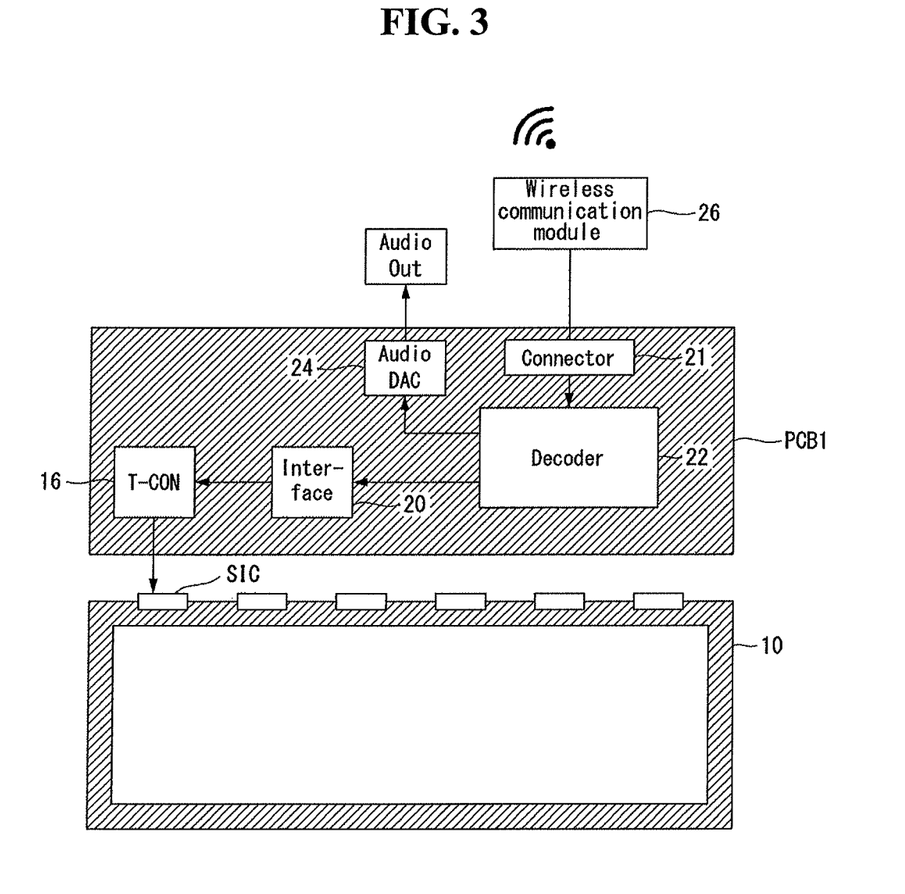
FIGS. 3 to 13 are views showing various embodiments of a PCB in a wireless display sink device.

The display panel driver 18 comprises a data driver 12 and a scan driver 14 that are connected to the display panel 10. The data driver 12 comprises a plurality of source drive ICs (Integrated Circuits). The SICs of FIG. 3 are source drive ICs. The data driver 12 converts video data input from the timing controller into a gamma compensation voltage to generate a data voltage and supply the data voltage to the data lines D1 to Dm. The scan driver 14 sequentially supplies a scan pulse (or gate pulse) synchronized with the data voltage to the scan lines G1 to Gn and selects lines of the display panel 10 to which data is written.

The timing controller 16 transmits video data of an input image to the data driver 12 by a signal defined according to a mini LVDS (Low-Voltage Differential Signaling) interface protocol or EPI (Embedded Panel Interface) interface protocol. The interface technologies proposed in Korean Patent Application No. 10-2008-0127458 (2008 Dec. 15), U.S. patent application Ser. No. 12/543,996 (2009 Aug. 19), Korean Patent Application No. 10-2008-0127456 (2008 Dec. 15), U.S. patent application Ser. No. 12/461,652 (2009 Aug. 19), Korean Patent Application No. 10-2008-0132466 (2008 Dec. 23), and U.S. patent application Ser. No. 12/537, 341 (2009 Aug. 7) may be applied as the EPI interface. The timing controller 16 controls the operation timing of the display panel driver 18 based on timing signals received together with video data. The timing signals comprise a vertical synchronization signal Vsync, a horizontal synchronization signal Hsync, a clock signal CLK, a data enable signal DE, and a main clock MCLK.

FIGS. 3 to 13 are views showing various examples where the components of FIG. 1 are mounted on the PCB of the wireless display sink device.

Referring to FIG. 3, PCB1 is connected to the display panel driver 18 through a flexible circuit such as an FFC (Flexible Flat Circuit) or an FPC (Flexible Printed Circuit).

The decoder 22, the audio DAC 24, the interface 20, the timing controller 16, etc are mounted on PCB1. The wireless communication module 26 is connected to PCB1. A cable connected to the wireless communication module 26 may be connected to a connector 21 mounted on PCB1.

Figure 4:
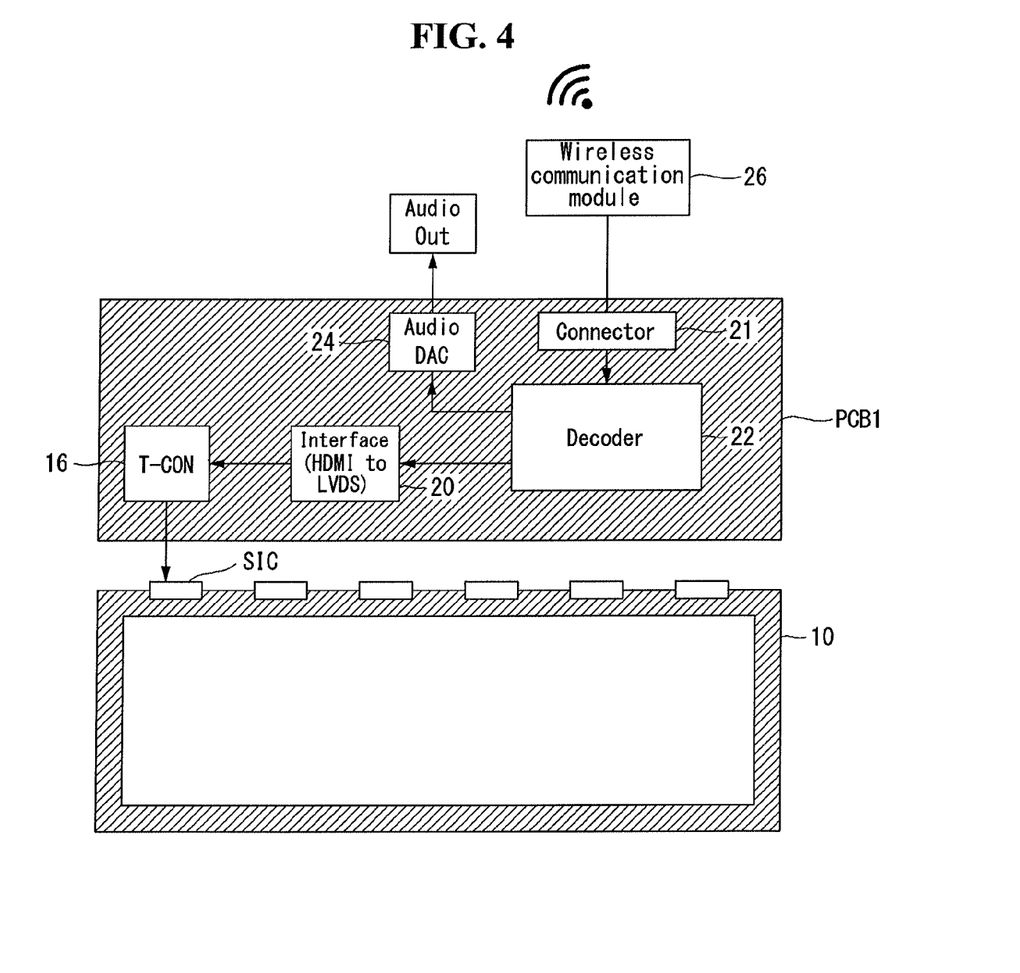

Referring to FIG. 4, the decoder 22 may output restored video data in a TMDS (Transition Minimized Differential Signaling) format defined according to the HDMI (High-Definition Multimedia Interface) standard. The interface 20 converts video data, which is received in a TMDS signal for HDMI, into an LVDS signal format, a display data transmission format, and transmits it to the timing controller 16. The timing controller 16 converts the video data of the LVDS signal received from the interface 20 into a mini-LVDS interface signal or EPI interface signal and transmits it to the data driver 12.

Figure 5:
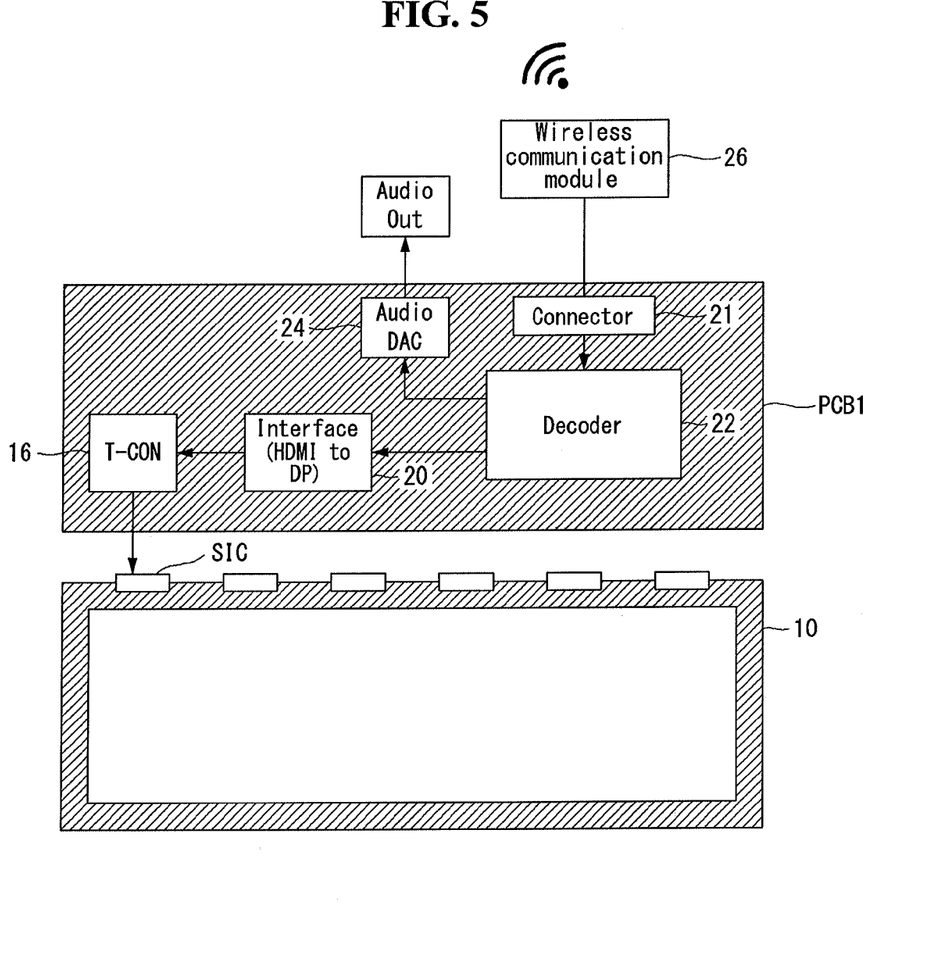

Referring to FIG. 5, the decoder 22 may output restored video data and audio data in HDMI signal format. The interface 20 separates video data from an HDMI signal, and converts the video data into a DP (DisplayPort) signal complying with a display data transmission standard. The timing controller 16 converts video data of a DP signal received from the interface 20 into a mini-LVDS interface or EPI interface signal and transmits it to the data driver 12.

Figure 6:
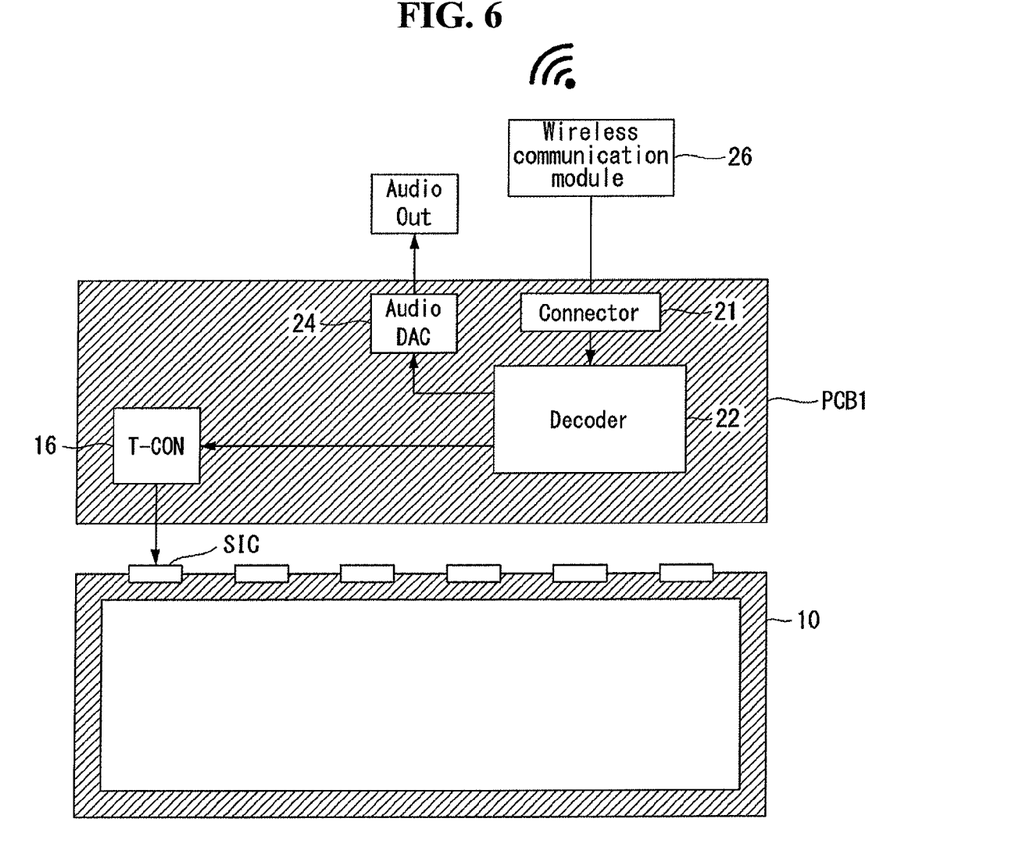

Referring to FIG. 6, the decoder 22 may output restored video data in HDMI signal format. The timing controller 16 converts the video data of the HDMI signal received from the interface 20 into a mini-LVDS interface signal or EPI interface signal and transmits it to the data driver 12. The HDMI signal contains audio data and video data. The timing controller separates audio data and video data, and transmits only the video data to the data driver 12. In this exemplary embodiment, a TMD signal is transmitted directly to the timing controller 16, so the interface 20 for switching interfaces is omitted, thereby reducing switching loss and circuit costs.

Figure 7:
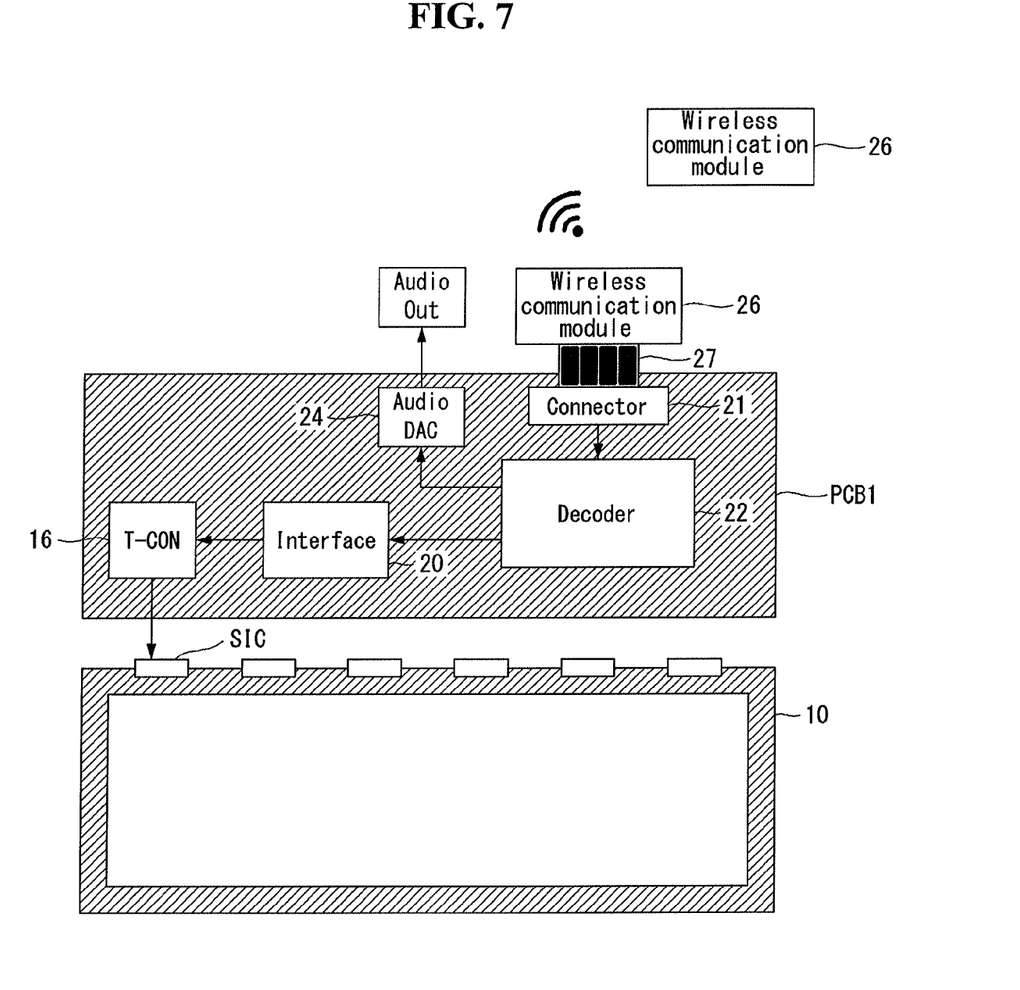

Referring to FIG. 7, the wireless communication module 26 may be connected to PCB1 through a card slot 27. In this case, the wireless communication module 26 is in the form of a card and detachably connected to a slot mounted on PCB1.

A display device requires a power supply part that generates power and supplies it to the pixels of the display panel 10. A liquid crystal display LCD may comprise a backlight unit for illuminating the display panel 10 and a light source driver for turning on the light sources of the backlight unit. PCB1 may be designed as shown in FIG. 8 if the power supply part and the light source driver are mounted on PCB1.

Figure 8:
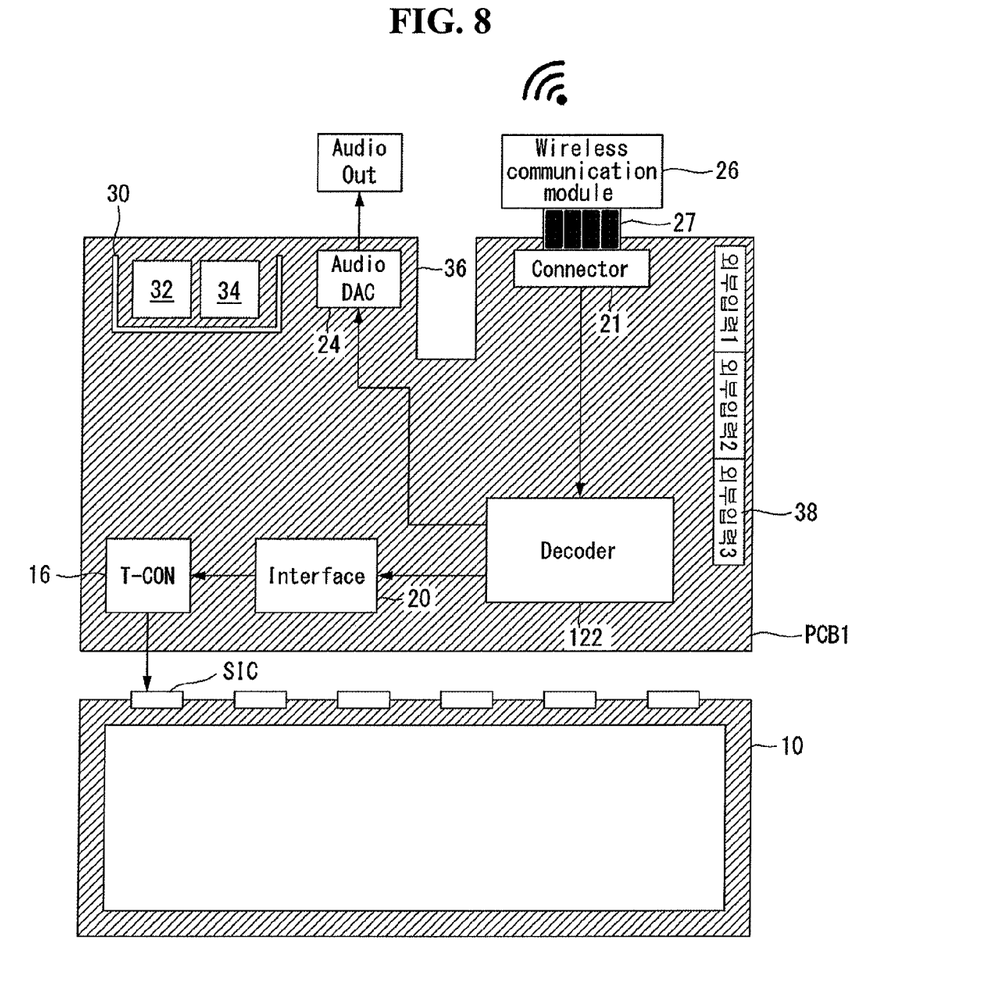

Referring to FIG. 8, a power supply part 32 and a light source driver 34 may be further mounted on PCB1. The power supply part 32 generates power and applies it to the pixels of the display panel 10, for instance, a common voltage Vcom and gamma compensation voltage for a liquid crystal display LCD, a pixel driving voltage ELVDD for an organic light emitting display OLED, a scan pulse voltage, etc. The light source driver 34 generates a light source driving voltage required to turn on backlight sources. The backlight sources may be LEDs (Light Emitting Diodes).

PCB1 comprises video/audio lines through which video data and audio data are transmitted in high-frequency signals between the wireless communication module 26 and the decoder 122. The output voltages of the power supply part 32 and light source driver 34 are much higher than those of other circuits. Due to this, the high-frequency signals transmitted at low voltages through the video/audio lines may be affected and distorted by the power supply part 32 and the light source driver 34. To avoid this, PCB1 may further comprise a slot 30 formed around either or both of the power supply part 32 and the light source driver 34 and another slot 36 formed between either or both of the power supply part 32 and the light source driver 34 and the video/audio lines.

The decoder 22 may incorporate a scaler to adjust the resolution of an input image in accordance with the resolution of the display panel 10. The scaler of the decoder 122 may convert video data input through external input terminals 38 mounted on PCB1 from the original resolution to the resolution of the display panel 10. A standard cable such as HDMI, DVI (Digital Visual Interface), or D-SUB is connected to the external input terminals to receive video data via the cable.

Figure 9:
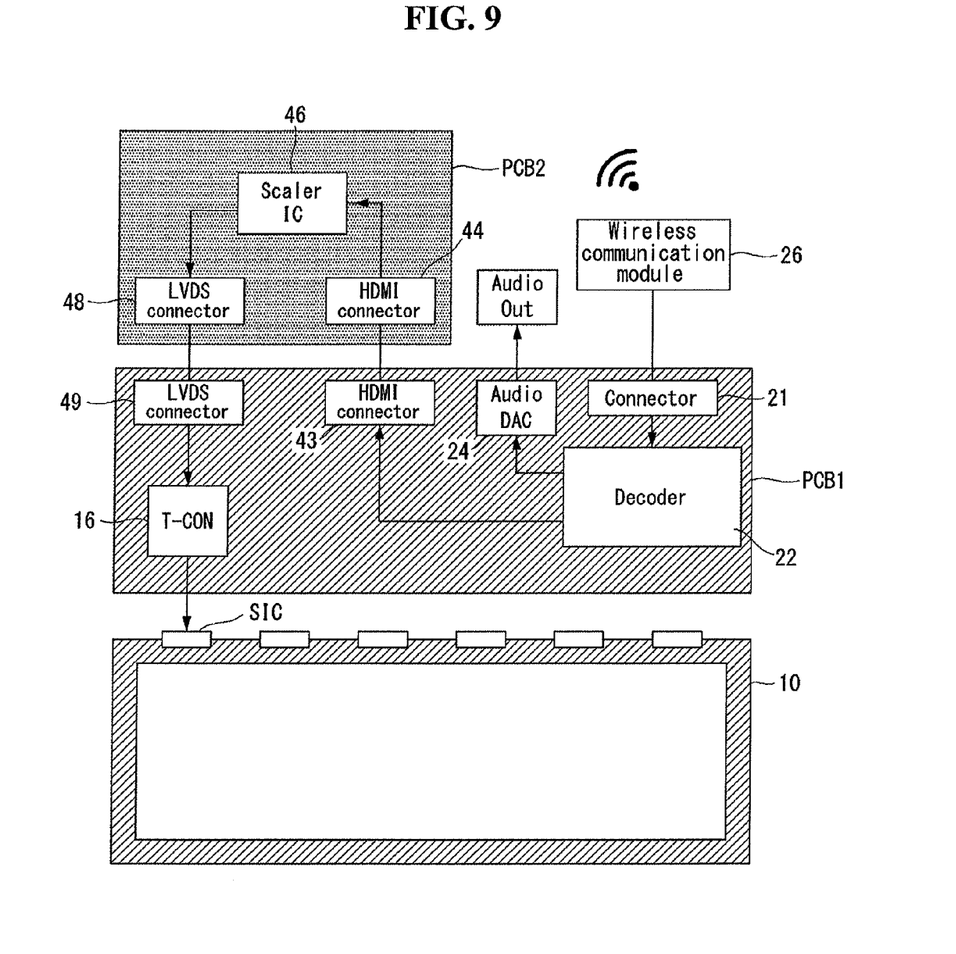
Figure 10:
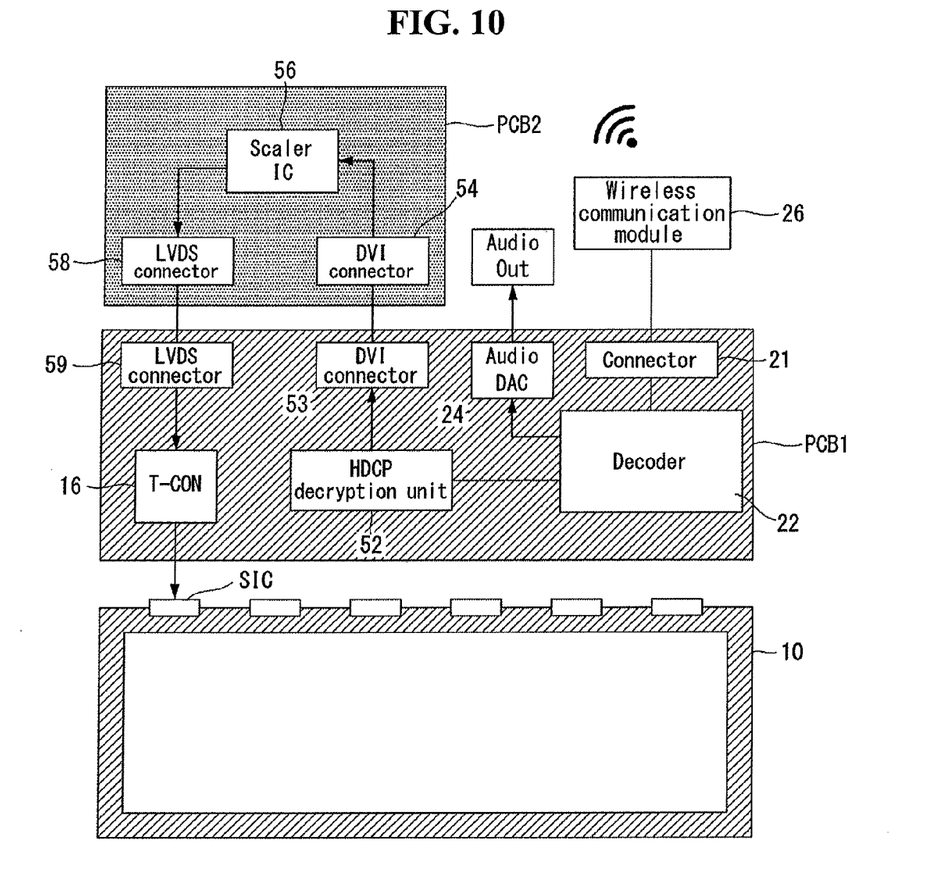

In the exemplary embodiment shown in FIG. 8, no scaler board is required because a scaler is embedded in the decoder. FIGS. 9 and 10 show examples where a scaler board PCB2 is connected to PCB1.

Referring to FIG. 9, the scaler board PCB2 is connected to PCB1 via HDMI connectors 43 and 44, a cable connected between the HDMI connectors 43 and 44, LVDS connectors 48 and 49, and a cable connected between the LVDS connectors 48 and 49.

Video data in HDMI signal format output from the decoder 22 is transmitted to a scaler IC 46 via the HDMI connectors 43 and 44 and the cable connected between them. The scaler IC 46 converts video data received in an HDMI signal from the original resolution to the resolution of the display panel 10, and outputs the video data in an LVDS signal. The video data output from the scaler IC 46 is transmitted to the timing controller 16 via the LVDS connectors 48 and 49 and the cable connected between them.

Referring to FIG. 10, the scaler board PCB2 is connected to PCB1 via DVI connectors 53 and 54, a cable connected between the DVI connectors 53 and 54, LVDS connectors 58 and 59, and a cable connected between the LVDS connectors 58 and 59.

The source device may encrypt video data by HDCP (High-Bandwidth Digital Content Protection) encryption to transmit it by the wireless display sink device. In this case, the wireless display sink device must use an HDCP decryption unit to restore the original video data. The HDCP decryption unit 52 may be embedded in the decoder 22 or connected to the output terminal of the decoder 22. The HDCP decryption unit 52 may be likewise connected to the decoder 22 in the foregoing embodiments.

The HDCP decryption unit 52 outputs restored video data in a DVI signal or HDMI signal. The DVI signal is transmitted to the scaler IC 56 via the DVI connectors 53 and 54 and the cable connected between them. The scaler IC 56 converts video data received in a DVI signal from the original resolution to the resolution of the display panel 10, and outputs the video data in an LVDS signal. The video data output from the scaler IC 56 is transmitted to the timing controller 16 via the LVDS connectors 58 and 59 and the cable connected between them.

Figure 11:
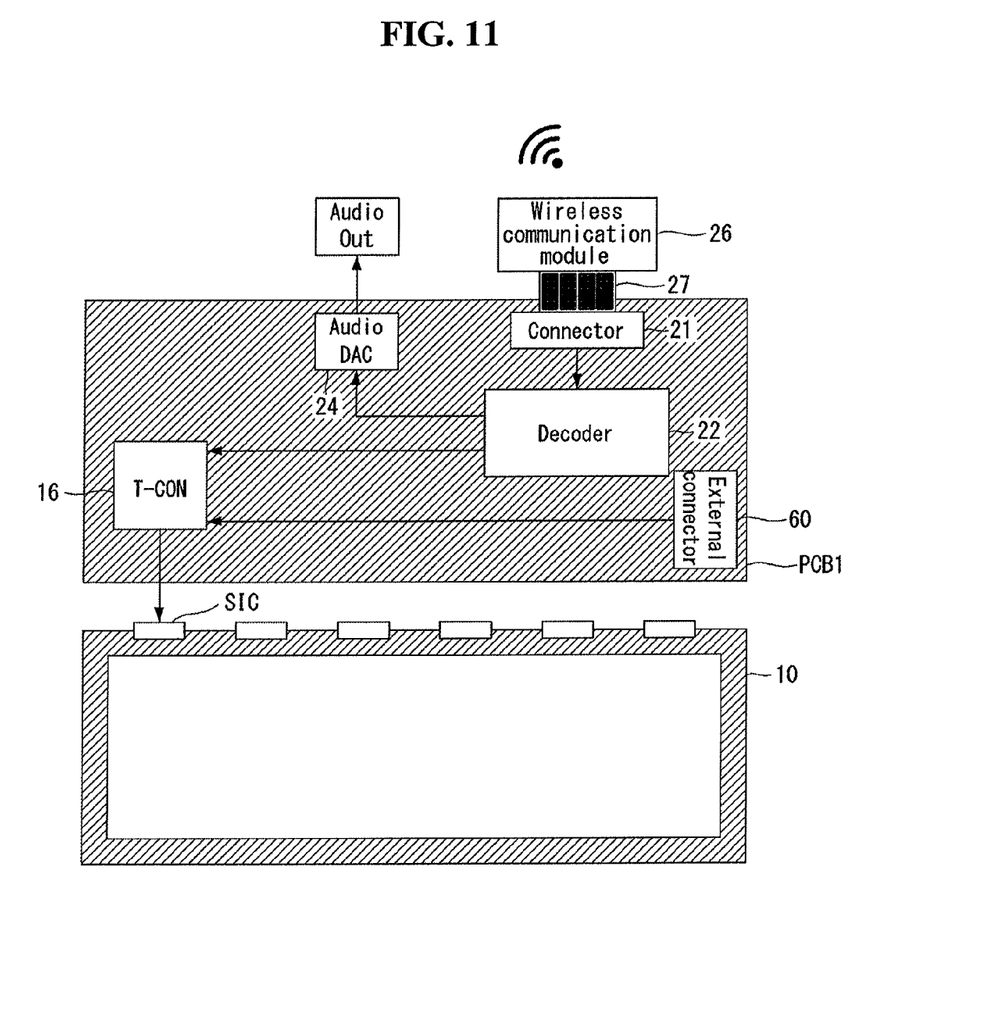

Referring to FIG. 11, the timing controller 16 may receive signals through 2-port input terminals. The first input port of the timing controller 16 is connected to the output terminal of the decoder 22 or HCDP decryption unit 52 to receive output signals from the decoder 22, and the second input port may be connected to an external connector 6 to receive external input signals. The external connector 6 may be connected to an external video source via a cable to transmit video data signals received from the external video source directly to the timing controller 16.

Figure 12:
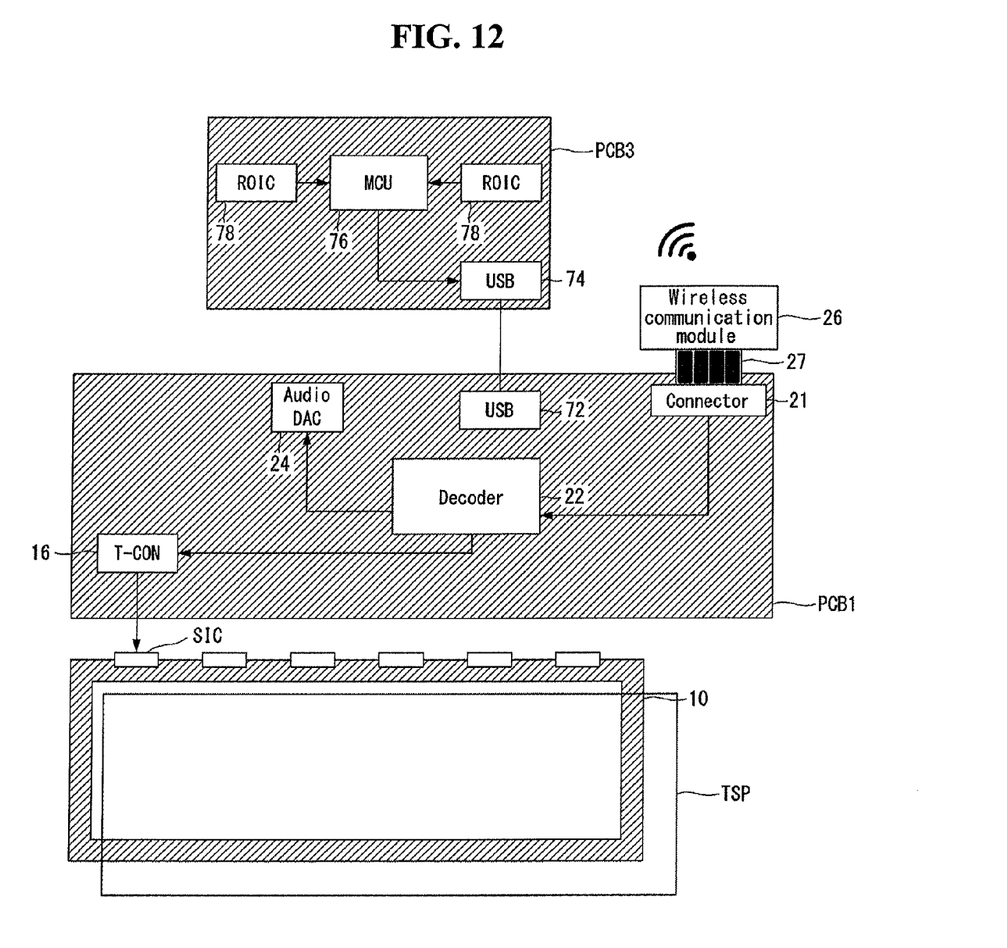

As shown in FIG. 12, the screen of the display panel 10 may be implemented as a touch screen TSP comprising touch sensors. A touch sensing driver detects touch input by sensing a signal variation in the touch sensors.

Referring to FIG. 12, the touch sensing driver may comprise an ROIC (Readout Integrated Circuit) 78 that applies a drive signal to the touch sensors, detects a touch sensor signal variation, and converts it into a digital value and an MCU (Micro Controller Unit) 76 that compares the digital value with a predetermined threshold value and estimates the presence or absence of touch input and the coordinates of a touch input position. The touch sensing driver may be mounted on a touch signal processing board PCB3. The touch signal processing board PCB3 may be connected to the lines of the touch screen via a flexible circuit or cable.

The touch signal processing board PCB3 may be connected to PCB1 through USB (Universal Serial Bus) connectors 72 and 74 and a USB cable. A touch report output from the MCU 76 is transmitted to PCB1 through the USB connectors, converted into a wireless signal through a wireless communication module, and transmitted to the source device. The touch report contains coordinate information of each touch input. The source device runs an application program associated with the touch input coordinates.

The touch sensors and touch sensing driver of FIG. 12 may further involve gesture sensing and recognition functions. In this case, gesture input coordinate information, along with the touch input coordinates, may be transmitted into a wireless signal and transmitted to the source device.

Figure 13:
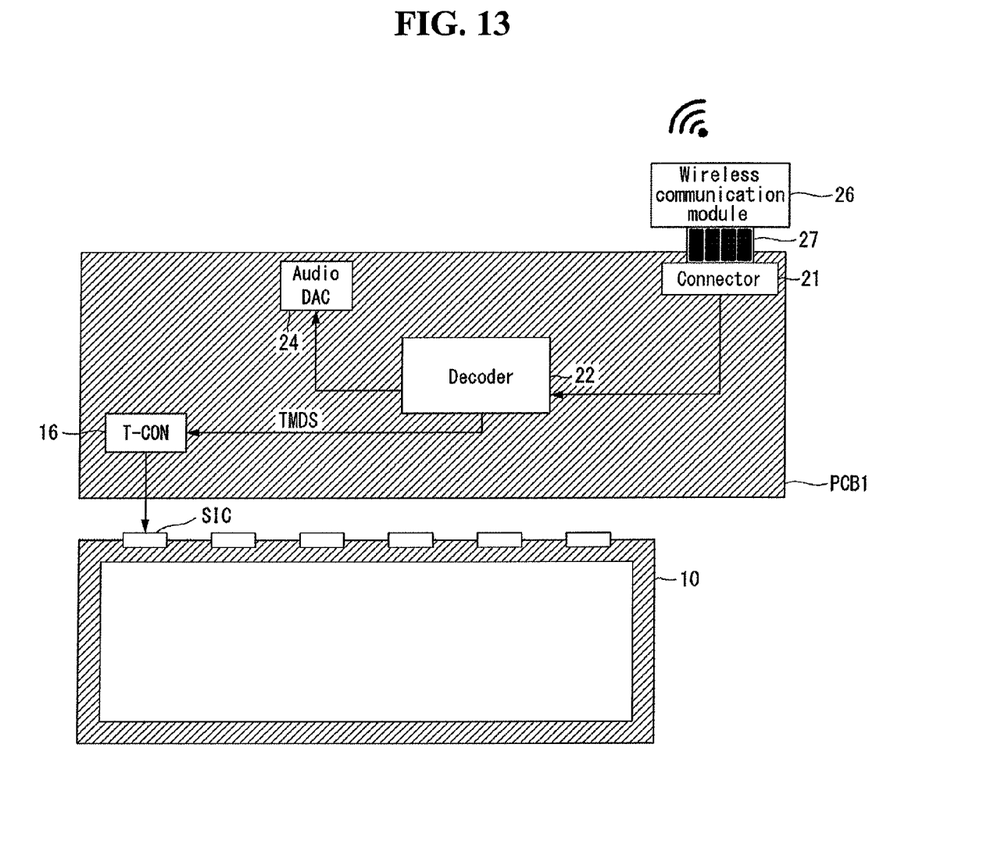

Referring to FIG. 13, the decoder 22 may output video data separated from an HDMI signal in a TMDS signal and transmit the TMDS signal directly to the timing controller 16.

The configurations of the wireless display sink devices shown in FIGS. 3 to 13 can be used in combination. As shown in FIG. 8, the method of forming a power supply part, a light source driver, and a slot may be applied to the PCBs disclosed in other exemplary embodiments.

As described above, a wireless display sink device can wirelessly share contents with a source device by connecting a wireless communication module to a PCB with a timing controller mounted on it to control a display panel driver and enable N-screen service by screen mirroring.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless display sink device comprising:
   a PCB (Printed Circuit Board) having a connector for receiving video and audio data from a detachable wireless communication module in a format:
   a decoder for received format disposed on the PCB;
   a display panel driver;
   video/audio lines through which video data and audio data are transmitted as high-freuquency signals from the connector to
   the decoder which decodes audio/video data received in the format from the wireless communication module and separates audio data and video data;
   an audio DAC (DigitalAnalog Converter) that is disposed on the PCB and converts the audio data into an analog signal;
   a timing controller that is disposed on the PCB, transmits the video data to the display panel driver, and controls the operation timing of the display panel driver,
   a power supply part disposed on the PCB, wherein the power supply part generates power and supplies the power to the pixels of the display panel;
   a backlight unit that illuminates the display panel;

a light source driver that is disposed on the PCB and generates a light source driving voltage to turn on the light sources of the backlight unit; and an air slot formed in the PCB between the power supply part or the light source driver and the video/audio lines wherein the video/audio lines and the air slot are disposed on the PCB.

2. The wireless display sink device of claim 1, comprising an interface disposed on the PCB and connected between the decoder and the timing controller to relay a signal from the decoder to the timing controller.

3. The wireless display sink device of claim 2, wherein the interface converts an HDMI (High-Definition Multimedia Interface) signal into an LVDS (Low-Voltage Differential Signaling) signal or converts the HDMI signal into a DP (DisplayPort) signal.

4. The wireless display sink device of claim 1, wherein the timing controller receives an HDMI signal or TMDS (Transition Minimized Differential Signaling) signal output directly from the decoder.

5. The wireless display sink device of claim 1, wherein the wireless communication module is connected to the PCB through a card slot.

6. The wireless display sink device of claim 1, further comprising:
an external input terminal disposed on the PCB for receiving an HDMI signal;
an external input terminal disposed on the PCB for receiving a DVI (Digital Visual Interface) signal; and
an external input terminal disposed on the PCB for receiving a D-SUB signal.

7. The wireless display sink device of claim 1, further comprising a scaler board connected to the PCB,
the scaler board having a scaler IC (Integrated Circuit) mounted thereon,
wherein the scaler IC converts an HDMI signal received from the decoder into an LVDS signal or DVI signal and transmits the signal to the timing controller.

8. The wireless display sink device of claim 1, further comprising a decryption unit connected to the output terminal of the decoder to restore an encrypted signal received from the decoder.

9. The wireless display sink device of claim 1, further comprising a connector that is disposed on the PCB and receives an external input signal, and the timing controller receives an output signal from the decoder through a first input port and receives the external input signal through a second input port.

10. The wireless display sink device of claim 1, further comprising:
a touch screen formed on the display panel; and
a sensing circuit that senses touch input or gesture input by analyzing a signal on the touch screen,
wherein coordinate information output from the sensing circuit is transmitted to the PCB over a USB (Universal Serial Bus) path, converted into a wireless signal through the wireless communication module, and transmitted to an external source device.

11. The wireless display sink device of claim 5, wherein the wireless communication module is in the form of a card inserted into the card slot.

* * * * *